Patented Jan. 26, 1937

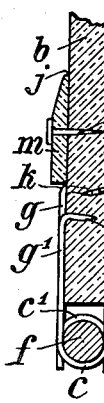
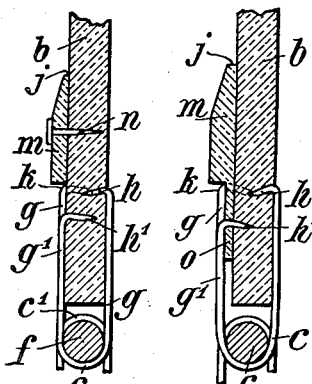
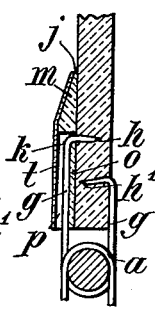
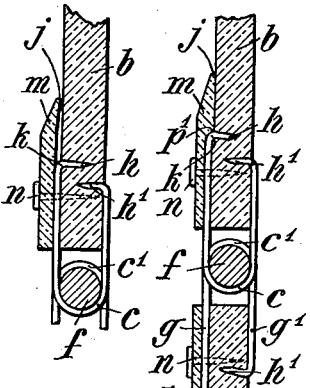
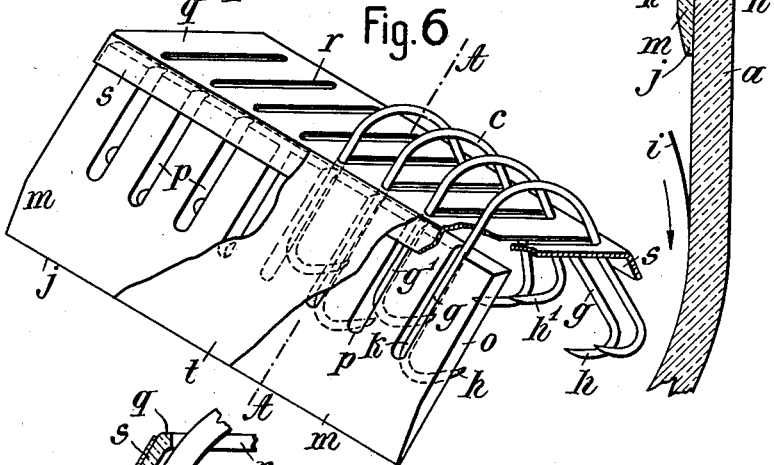
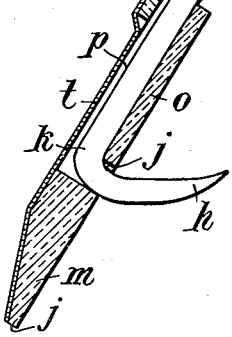

2,068,826

UNITED STATES PATENT OFFICE 2,068,826

BELT FASTENER

Alfred Timmerbeil, Arnhem, Netherlands

Application November 14, 1934, Serial No. 753,027
In Germany February 17, 1934

10 Claims. (Cl. 24—33)

The present invention relates to belt fasteners more particularly of the kind comprising U-shaped belt lacing hooks. In the known belt fasteners of this type, the belt hooks are subjected to very considerable wear upon the running side of the belt owing to the friction occurring between the belt pulleys and the belt. This wear is increased owing to the fact that the metallic contact between the belt hooks and the belt pulley considerably increases the slip of the belt relatively to the pulley, which, of course, also results in the belt hooks slipping upon the belt pulleys. The ends of the belt hooks are partly exposed as they are subjected on running upon the belt pulleys to considerable shocks. This not only causes rapid wear of the belt hooks at the ends, but also results in producing a very unpleasant noise.

All these drawbacks are avoided according to the invention by providing at the ends of the fastener hooks, upon the running side of the belt, a protective strip made of rubber, leather, cardboard, or other resilient material. This strip constitutes a cushion made of a material damping the impact and the sound, and protects the ends of the hooks against any stresses due to impact, shock and vibration and therefore prevents premature wear. It also considerably reduces the noise and the slip. Preferably the protective strips are made of such thickness that they project above the upper surface of the hooks and thereby avoid any direct contact of the hooks with the belt pulley not only at the ends, but along the whole length of the hooks. In this manner, the increase of slip caused by the metallic contact between the belt hooks and the belt pulleys, is entirely avoided. The protective strips insure a smooth and noiseless running and they also considerably increase the durability of the belt fasteners. The action of the protective strip may be further improved by bevelling or pointing the leading edge of the strip.

The improved strip may be fixed to the belt either directly by rivets, pins or like members, or it may be indirectly secured to the belt by fixing flaps or extensions which are interposed between the ends of the hooks and the belt and are fixed to the belt by the hooks.

Fixing the protective strip indirectly by means of special connection flaps or extensions has the advantage that the means for connecting the strip to the belt is not at all subjected to wear by friction through contact with a belt pulley.

The connection flaps or extensions are preferably made of the same thickness as the protective strip itself, and are provided with grooves or like recesses for the reception of the wire hook lengths. In this construction effective protection of the hook limbs against contact with the belt pulleys can be attained even with a comparatively small thickness of the protective strip as the limbs of the wire hooks are then embedded in the extensions or connection flaps of the protective strip.

The protective strip may be extended, so that it covers partly or entirely the limbs of the belt hooks. In this construction the protective strip is preferably provided upon its under side with grooves or a recess for the reception of the limbs of the belt hooks. These grooves or recesses may however be entirely omitted, particularly in cases in which the limbs of the belt hooks are partly pressed into the surface of the belt and consequently project therefrom only very slightly. Owing to the fact that the belt hooks are covered by the protective strips particularly at their ends, the ends or points of the hooks driven into the belts are secured against accidental loosening or removal from the belt.

The belt fastener used for connecting the two belt ends, may be provided with the protective strip forming the subject of the invention before it is driven into the belt, this method considerably facilitating the fixing or mounting of the protective strip. The protective strip may for this purpose be fixed to the belt hooks by the aid of adhesive strips.

In connection with belt fasteners in which the individual belt hooks are held in the required position for connection to the belt by means of a grid-like strip made of paper, cardboard or like material, the protective strip may also be fixed to the grid strip. The protective strip may also be made in one piece with the grid strip.

The accompanying drawing shows by way of example five constructions embodying the features of the invention.

Fig. 1 shows in cross section the improved belt fastener, only one portion of the joint being shown.

Figs. 2, 3, 4 and 5 show four modifications, also in section, with the exception of Fig. 5 in which a complete fastening is shown.

Fig. 6 shows in perspective view a belt fastener provided with the improved protective strip, and Fig. 7 is a partial section on line VII—VII of Fig. 6.

In the illustrated constructions, $a$ and $b$ indicate the two belt ends which are connected together in a manner known per se by U-shaped double wire hooks $c$, $c^1$ and a link pin inserted through the eye portions of the double hooks. The limbs $g$, $g^1$ of the double hooks are of different lengths so that the points $h$, $h^1$ of the hooks, which are as usual bent at an angle slightly larger than 90°, are not opposite each other.

At the ends $k$ of the belt hooks, either in front of or partly in contact with the hooks, there is provided according to the invention upon the running side of the belt, a cushioning strip $m$ made of rubber, leather, cardboard or like resilient material, which avoids direct contact of the belt pulley $i$ (Fig. 5) with the belt hooks, particularly at the ends $k$ of the hooks, when the belt runs into contact with the belt pulley. By these strips, the ends $k$ of the hooks are protected against stresses due to impact shocks and against premature wear, and at the same time the noise due to these shocks is considerably reduced. The protective strip $m$ may be made of such thickness that the limbs $g$, $g^1$ of the hooks will not project beyond the upper surface of the strips. It is preferred to make the strips even of greater thickness and thereby avoid contact between the hooks and the belt pulley not only at the ends $k$, but over the whole length of the limbs $g$, $g^1$. In this way, the increase of slip hitherto caused by the metallic contact between the belt hooks and the belt pulley is entirely avoided and the running is rendered smooth with a corresponding increase of efficiency of the belt. The smooth running is further enhanced by bevelling or pointing the protective strip at the leading edge $j$.

In the construction shown in Figs. 1, 4 and 5, the cushioning strip $m$ is fixed to the belt directly by tacks or nails $n$ whilst in the construction shown in Figs. 2 and 3, the connection is effected by means of connection flaps or extensions $o$ formed upon the protective strip. The points $h$, $h^1$ of the belt hooks are driven through these connection flaps or members into the belt, so that the connection members or flaps $o$ are clamped between the limbs $g$, $g^1$ of the belt hooks and the belt. This indirect connection has, as compared with the direct connection by means of rivets, pins or the like, the advantage that it is entirely free from tear due to frictional contact with the belt pulley.

Fig. 4 shows a construction in which the protective strip $m$ takes over the hook limbs $g$, $g^1$ so that these limbs are covered by the protective strip up to the ends of the belt. Fixing of the belt is effected by nails or tacks $n$ which are driven into the belt between two adjacent hook limbs. The leading edge $j$ will, in this construction, during running automatically bear fast against the surface of the pulley. If desired, the protective strip may be from the start given a somewhat curved or bent shape, or it may be provided, as shown in Fig. 3, upon its under side with grooves $p$ or a recess. In these two constructions, the protective strips serve at the same time as a protection of the hooks against loosening and as a protection against removal of the points $h$, $h^1$ from the belt.

Figs. 6 and 7 show a belt fastener suitable for making the construction shown in Fig. 3. This fastener consists of a number of V-shaped double belt hooks and a grid strip holding the hooks in the required position for fixing to the belt. The grid strip $q$ is made of a rectangular strip of paper or cardboard provided with transverse slots $r$ for the reception of the apex portions of the belt hooks. The transverse slots are of such length that upon complete insertion of the belt hooks into the slots, the apex portions of the hooks project from one side of the strip, whilst the limbs of the hooks project from the other side of the strip. Adjacent to the ends of the transverse slots the edge portions $s$ of the grid strips are bent obliquely so that they lie parallel to the limbs $g$, $g^1$ of the hooks.

To one set of limbs of the fastener hooks is fixed a protective strip $m$ as shown in the construction illustrated by Fig. 3. This protective strip $m$ is connected with the slotted grid strip $q$ by means of an adhesive strip $t$ mounted upon the outer surface of the strip $m$ and the portion $s$ of the strip $q$. As will be seen from Fig. 6, the adhesive strip $t$ is fixed to the portion $s$ of the strip $q$ which latter overlaps the extended portion $o$ of the protective strip $m$ and is also fixed to the whole of the protective strip $m$ and its extension $o$ with the exception of that portion of the extension $o$ which underlies the portion $s$. The strip $t$ is fixed to $s$ and $m$, $o$ by means of any suitable adhesive and it extends down to the leading edge $j$ of the protective strip $m$. The grooves or recesses $p$ provided in the extension $o$ of the protective strip $m$ receive the limbs $g$, $g^1$ of the hooks which are therefore completely covered by the adhesive strip $t$.

After the fastener shown in Fig. 6 has been fixed to the end of the belt, the perforated grid strip $q$ can be torn off, as it has performed its function of holding the hooks in the required position during fixing. This connection of the fastener with the protective strip has the advantage that it is not necessary to fix the protective strip by a separate operation. Moreover, the fastener has owing to its combination with the protective strip a very simplified form. On hammering the fastener into the belt it is only necessary to take care that the protective strip be upon the running side of the belt.

The invention is, of course, not limited to the constructions shown, various modifications and changes being possible, particularly as regards the dimensions and the form of the protective strip and the means for securing same. Moreover, the fastener hooks might be connected together by fixed webs. Instead of wire hooks, belt fasteners made by stamping from a sheet blank could be used.

I claim:

1. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops.

2. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, each of said strips having an extension provided with an edge coterminous with the belt at the edge remote from the bevelled edge.

3. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley, each of said strips being at least as thick as the diameter of the legs of said loops, each of said strips having the ends remote from the loops bevelled, each of said strips having an extension provided with an edge coterminous with the belt at the edge remote from the bevelled edge and said extension being positioned beneath said portions of the loops extending over the belt end.

4. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, each of said strips having an extension through which the loop ends pass to secure the strips to the belt end.

5. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, each of said strips having an extension through which the loop ends pass to secure the strips to the belt end, said extension having spaced grooves housing the legs of said loops.

6. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, and means independent of the loops for securing the strips to the belt end.

7. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, each of said strips having an extension through which the loop ends pass to secure the strips to the belt end, and adhesive strips covering the said strips and loops.

8. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, each of said strips having an extension through which the loop ends pass to secure the strips to the belt end, said extension having spaced grooves housing the legs of said loops, and adhesive strips covering the said strips and loops.

9. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and at the belt engaging ends of the rows of loops whereby to prevent engagement of said ends with a pulley each of said strips being at least as thick as the diameter of the legs of said loops, each of said strips having the end remote from the loops bevelled, each of said strips having an extension through which the loops ends pass to secure the strips to the belt end, adhesive strips covering the said strips and loops, and a grid strip having slots through which the loops project and having one edge engaged between one of the adhesive strips and one of the first mentioned strips.

10. The combination with means to flexibly connect adjacent ends of driving belts consisting of two rows of spaced loops having inbent ends engaging the respective belt end with the loops on one end interfitting the loops on the other end, and a pin passing through the loops; of two protective strips of shock and sound damping material positioned on the face of the belt engageable with a belt pulley and positioned at the belt engaging ends of the rows of loops whereby to prevent engagement of said ends with a pulley each of said strips being at least as thick as the diameter of the legs of said loops, each of said strips having the end remote from the loops bevelled, each of said strips having an extension through which the loop ends pass to secure the strips to the belt end, said extension having spaced grooves housing the legs of said loops, adhesive strips covering the said strips and loops, and a grid strip having slots through which the loops project and having one edge engaged between one of the adhesive strips and one of the first mentioned strips.

ALFRED TIMMERBEIL.